US009872437B2

United States Patent
Markusson et al.

(10) Patent No.: US 9,872,437 B2
(45) Date of Patent: Jan. 23, 2018

(54) ROBOTIC WORK TOOL SYSTEM AND METHOD COMPRISING A CHARGING STATION

(71) Applicant: HUSQVARNA AB, Huskvarna (SE)

(72) Inventors: Olle Markusson, Bankeryd (SE); Patrik Jägenstedt, Tenhult (SE); Peter Hallin, Habo (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/767,155

(22) PCT Filed: Feb. 20, 2013

(86) PCT No.: PCT/SE2013/050148
§ 371 (c)(1),
(2) Date: Aug. 11, 2015

(87) PCT Pub. No.: WO2014/129943
PCT Pub. Date: Aug. 28, 2014

(65) Prior Publication Data
US 2015/0366137 A1 Dec. 24, 2015

(51) Int. Cl.
*H02J 7/00* (2006.01)
*A01D 69/02* (2006.01)
(Continued)

(52) U.S. Cl.
CPC ........... *A01D 69/02* (2013.01); *A01D 34/008* (2013.01); *B60L 1/003* (2013.01); *B60L 3/0061* (2013.01);
(Continued)

(58) Field of Classification Search
CPC ... H02J 7/0027; A01D 34/008; G05D 1/0225; A47L 2201/02
(Continued)

(56) References Cited

U.S. PATENT DOCUMENTS 5,959,423 A * 9/1999 Nakanishi ............. A47L 11/305
15/319
7,729,801 B2 * 6/2010 Abramson ........... A01D 34/008
320/107
(Continued)

FOREIGN PATENT DOCUMENTS

| EP | 2412222 A2 | 2/2012 |
| EP | 2413215 A2 | 2/2012 |
| WO | 2012044220 A1 | 4/2012 |

OTHER PUBLICATIONS

International Search Report and Written Opinion of corresponding application No. PCT/SE2013/050148 dated Jan. 17, 2014, all enclosed pages cited.

(Continued)

*Primary Examiner* — Nathaniel Pelton
*Assistant Examiner* — Johali Torres Ruiz
(74) *Attorney, Agent, or Firm* — McNair Law Firm, P.A.

(57) ABSTRACT

A robotic work tool system (200), comprising a charging station (210), a boundary wire (250), a signal generator (240) for generating and transmitting a signal through said boundary wire (250) for demarcating a work area (205) and for generating a magnetic field (265) for guiding a robotic work tool (100) to said charging station (210), said robotic work tool (100) being configured to detect a magnetic field strength of the magnetic field (265) in the work area (205), direct itself towards an increasing magnetic field strength, determine that the robotic work tool (100) is unable to reach the charging station (210), inform the robotic work tool system (200) accordingly, whereby the robotic work tool system (200) is configured to adapt a current level of the signal generating the magnetic field (365).

18 Claims, 3 Drawing Sheets

(51) Int. Cl.
    *A01D 34/00*     (2006.01)
    *B60L 1/00*     (2006.01)
    *B60L 3/00*     (2006.01)
    *B60L 8/00*     (2006.01)
    *B60L 11/18*     (2006.01)
    *B60L 15/20*     (2006.01)
    *G05D 1/02*     (2006.01)
    *G05D 1/03*     (2006.01)

(52) U.S. Cl.
CPC ........... *B60L 8/003* (2013.01); *B60L 11/1805* (2013.01); *B60L 11/1818* (2013.01); *B60L 11/1877* (2013.01); *B60L 15/20* (2013.01); *G05D 1/0225* (2013.01); *G05D 1/0265* (2013.01); *G05D 1/03* (2013.01); *H02J 7/0045* (2013.01); *B60L 2200/40* (2013.01); *B60L 2240/36* (2013.01); *B60L 2240/421* (2013.01); *B60L 2260/32* (2013.01); *G05D 2201/0208* (2013.01); *H02J 2007/0096* (2013.01); *Y02T 10/645* (2013.01); *Y02T 10/705* (2013.01); *Y02T 10/7005* (2013.01); *Y02T 10/7072* (2013.01); *Y02T 10/7083* (2013.01); *Y02T 10/72* (2013.01); *Y02T 10/7275* (2013.01); *Y02T 90/14* (2013.01)

(58) Field of Classification Search
USPC ...................... 320/107; 700/245; 318/568.12
See application file for complete search history.

(56) References Cited

U.S. PATENT DOCUMENTS

| | | | | |
|---|---|---|---|---|
| 2005/0267629 A1* | 12/2005 | Petersson | ............. | A01D 34/008 700/245 |
| 2007/0050086 A1* | 3/2007 | Lim | ..................... | G05D 1/0225 700/245 |
| 2008/0161969 A1* | 7/2008 | Lee | ..................... | G05D 1/0225 700/245 |
| 2008/0183349 A1* | 7/2008 | Abramson | ........... | A01D 34/008 701/23 |
| 2013/0025248 A1* | 1/2013 | Kraft | .................... | A01D 34/008 56/10.2 A |

OTHER PUBLICATIONS

Chapter I International Preliminary Report on Patentability of corresponding application No. PCT/SE2013/050148 dated Sep. 3, 2015, all enclosed pages cited.

\* cited by examiner

ROBOTIC WORK TOOL SYSTEM AND METHOD COMPRISING A CHARGING STATION

TECHNICAL FIELD

This application relates to a method and a robotic work tool system for a robotic work tool finding its way to a charging station, and in particular to a method and a robotic work tool system for a robotic work tool finding its way to a charging station by sensing magnetic field strengths.

BACKGROUND

Robotic work tool systems, such as lawnmower systems, are often electrically powered. Since the work task, that the robotic work tool is designed to perform, is often quite power consuming solar power may not provide an adequate power supply and many robotic work tools are designed to return to a charging station to recharge its batteries between or during work sessions. Many different manners of finding the way back to the charging station are known in the field of robotic work tools. Such manners include following a boundary wire to the charging station, following a guide cable to the charging station or following a magnetic field generated at and emanating from the charging station. Such a magnetic field, which is sometimes called an F-range, may be generated by a conducting wire loop through which a current is transmitted. The current will generate a magnetic field in the loop. The magnetic field will be strongest at the centre which is placed close to the charging station and a robotic work tool may find its way back to the charging station by propelling itself towards an increasing magnetic field strength. Details on how such an F-range may be established and how the robot may be configured to follow the F-range can be found in the European Patent Application EP 1 512 054 entitled "ELECTRONIC DIRECTING SYSTEM" that discloses an arrangement and an electronic navigational control system for a self-propelling device (5), preferably a lawn-mowing robot. The system comprises at least one navigational control system (3) connected to at least one signal generator (1) and a sensing unit arranged at the self-propelling device (5). The sensing unit senses at least one, in the air medium propagating, time and space varying magnetic field, at least transmitted via the navigational control station (3) and in turn retransmits at least one signal processed by the unit to at least one driving source which contributes to the device's movements across the surface. The system comprises means by which the signal generator (1) sends a current through the navigational control station (3), the current generating the time and space varying magnetic field, whereby the sensing unit comprises means by which the device (5) is manoeuvred based on the properties of the sensed magnetic field.

However, if a work area of the robotic work tool should contain objects or other obstacles such as walls, trellises, partitions, hedges or bushes, the robotic work tool may be blocked from following the magnetic field strength and may end up running out of power before reaching the charging station. The robotic work tool may also be prevented from finding its way to the charging station if the robotic work tool is configured to follow a boundary wire until it can detect the F-range and then follow the F-range and if the charging station is placed close to boundary wire in which case the F-range will extend also beyond the boundary wire and the robotic work tool may then accidentally escape the work area that the boundary wire encloses while it follows the higher prioritized F-range.

Furthermore, the manner of following an F-range may be unsuitable in certain work areas, for example where the charging station is placed in a cramped section that has a very narrow opening and that is difficult to enter correctly unless following a guide cable.

There is thus a need for an improved manner for a robotic work tool to find the way back to the charging station with a reduced risk of running out of battery by getting blocked from reaching the charging station.

SUMMARY

It is an object of the teachings of this application to overcome the problems listed above by providing a robotic work tool system, comprising a charging station, a boundary wire, a signal generator for generating and transmitting a signal through said boundary wire for demarcating a work area and for generating a magnetic field for guiding a robotic work tool to said charging station, said robotic work tool being configured to detect a magnetic field strength of the magnetic field in the work area, direct itself towards an increasing magnetic field strength, determine that the robotic work tool is (including if it has been) unable to reach the charging station, And adapt a detection of the magnetic field.

In one embodiment the robotic work tool is configured to adapt the detection of the magnetic field by informing the robotic work tool system accordingly, whereby the robotic work tool system is configured to adapt a current level of the signal generating the magnetic field.

In one embodiment, the robotic work tool is configured to adapt the detection of the magnetic field by adjusting a threshold level for detecting the magnetic field.

In one embodiment the robotic work tool is a robotic lawnmower.

It is also an object of the teachings of this application to overcome the problems listed above by providing a method for use in a robotic work tool system, comprising a charging station, a boundary wire, a signal generator for generating and transmitting a signal through said boundary wire for demarcating a work area and for generating a magnetic field for guiding a robotic work tool to said charging station, said method comprising: detecting a magnetic field strength of the magnetic field in the work area, directing itself towards an increasing magnetic field strength, determining that the robotic work tool is unable to reach the charging station, and adapt the detection of the magnetic field, by informing the robotic work tool system accordingly, and adapting a current level of the signal generating the magnetic field or by adjusting a threshold level for detecting the magnetic field.

The inventors of the present invention have realized, after inventive and insightful reasoning, that by adapting the detection (size and/or detection threshold level) of the F-range, the robotic work tool will suffer a smaller risk of getting stuck while following the F-range.

The teachings herein find use in robotic work tool systems such as robotic lawnmower systems. Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
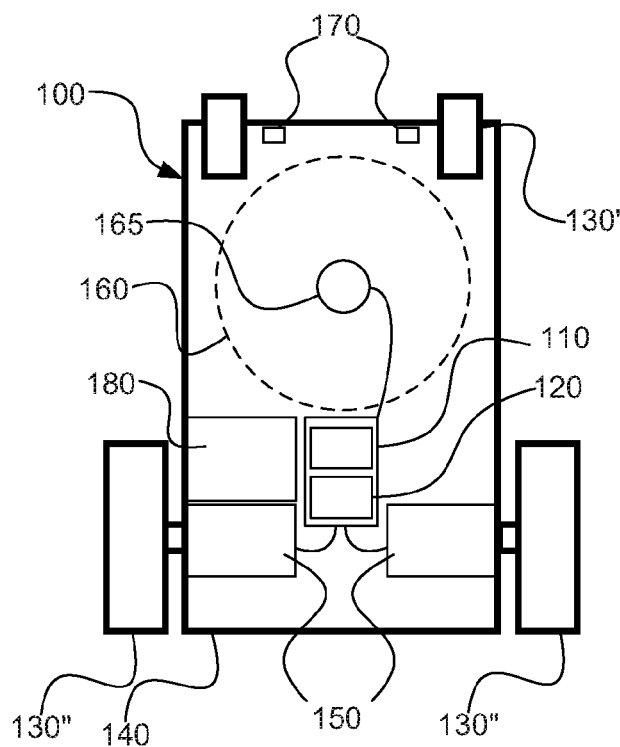
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robot 100 has 4 wheels 130, two front wheels 130' and the rear wheels 130". At least some of the wheels 130 are driveably connected to at least one electric motor 150. It should be noted that even if the description herein is focussed on electric motors, combustion engines may alternatively be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc.) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be implemented using any commonly known technology for computer-readable memories such as ROM, RAM, SRAM, DRAM, CMOS, FLASH, DDR, SDRAM or some other memory technology.

The robot 100 further has at least one sensor 170, in the example of FIG. 1 there are two sensors 170, arranged to detect a magnetic field (not shown). The sensors are connected to the controller 110 and the controller 1110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robot 100 is inside or outside an area enclosed by a boundary wire.

The controller 110 is connected to the motors 150 for controlling the propulsion of the robot 100 which enables the robot 100 to service an enclosed area without leaving the area.

The robot 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller is also configured to determine the load exerted on the rotating blade, by for example measure the power delivered to the cutter motor 165 or by measuring the axle torque exerted by the rotating blade. The robot 100 is, in one embodiment, a lawnmower robot.

The robot 100 also has (at least) one battery 180 for providing power to the motors 150 and the cutter motor 165.

Figure 2:
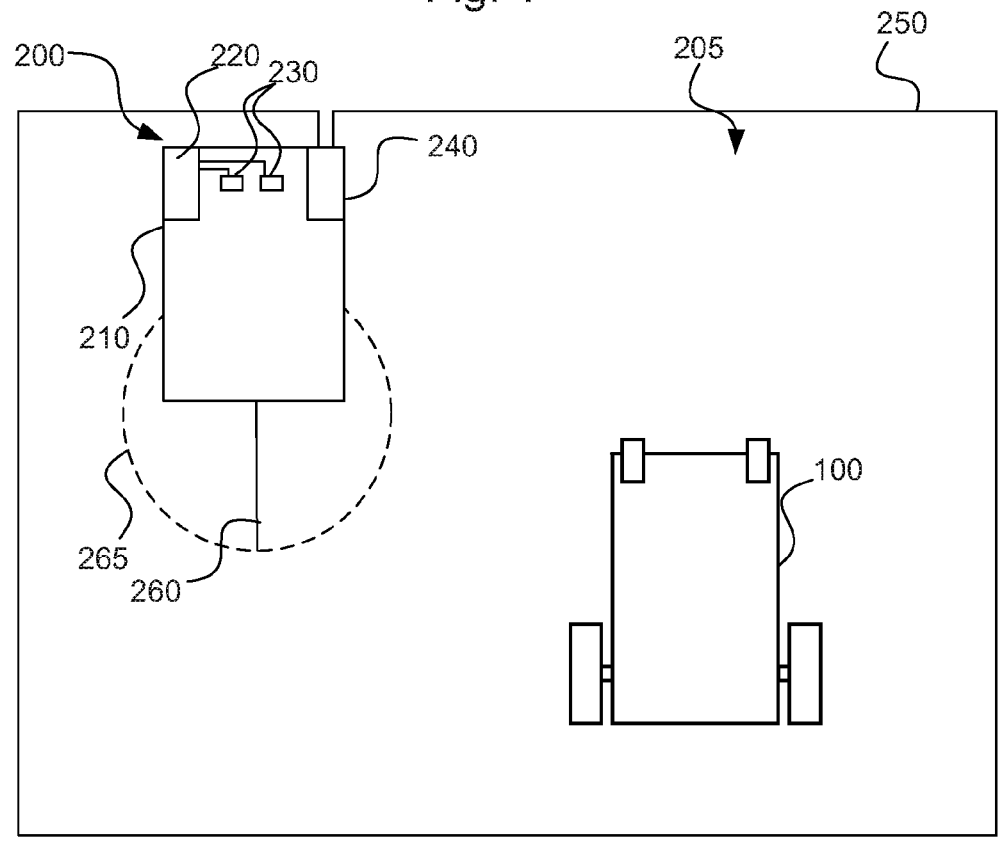
FIG. 2 shows a schematic view of a robotic working tool system according to one embodiment of the teachings of this application.

FIG. 2 shows a schematic view of a robotic working tool system 200 comprising a charging station 210 and a boundary wire 250 arranged to enclose a working area 205, the working area 205 not necessarily being a part of the robot system 200, in which the robot 100 is supposed to service. The charging station 210 has a charger 220 coupled to, in this embodiment, two charging plates 230. The charging plates 230 are arranged to co-operate with corresponding charging plates (not shown) of the robot 100 for charging the battery 180 of the robot 100. The charging station 210 also has, or may be coupled to, a signal generator 240 for providing a control signal (not shown) to be transmitted through the boundary wire 250. The control signal preferably comprises a number of periodic current pulses. As is known in the art, the current pulses will generate a magnetic field around the boundary wire 250 which the sensors 170 of the robot 100 will detect. As the robot 100 (or more accurately, the sensor 170) crosses the boundary wire 250 the direction of the magnetic field will change. The robot 100 will thus be able to determine that the boundary wire has been crossed. The use of more than one sensor 170 enables the controller 110 of the robot 100 to determine how the robot 100 is aligned with relation to the boundary wire 250 by comparing the sensor signals received from each sensor 170. This enables the robot to follow the boundary wire 250, for example when returning to the charging station 210 for charging.

Optionally, the charging station 210 also has a guide cable 260 for enabling the robot to find the entrance of the charging station 210. In one embodiment the guide cable 260 is formed by a loop of the boundary wire 250.

In one embodiment the guide wire 260 is used to generate a magnetic field 265 for enabling the robot 100 to find the charging station without following a guide cable 260. The field is sometimes referred to as an F-range indicating the range within which the field can be sensed. The F-range 265 may be generated by the guide cable 260 or other cable, possibly being arranged in a loop, or other means for generating a magnetic field.

The robot 100 may then find the charging station 210 by following the F-range 265 towards increasing field strength. Details on how such an F-range may be established and how the robot may be configured to follow the F-range can be found in the European Patent Application EP 1 512 054 entitled "ELECTRONIC DIRECTING SYSTEM".

By sending different current pulses through the guide cable 260 and the boundary wire 250, and possibly by generating the magnetic field in the F-range using a different current profile, the robot 100 will be able to determine which magnetic field results from which cable/field. The different control signals may for example comprise coded signals that differentiate the cables 250, 260.

Figure 3:
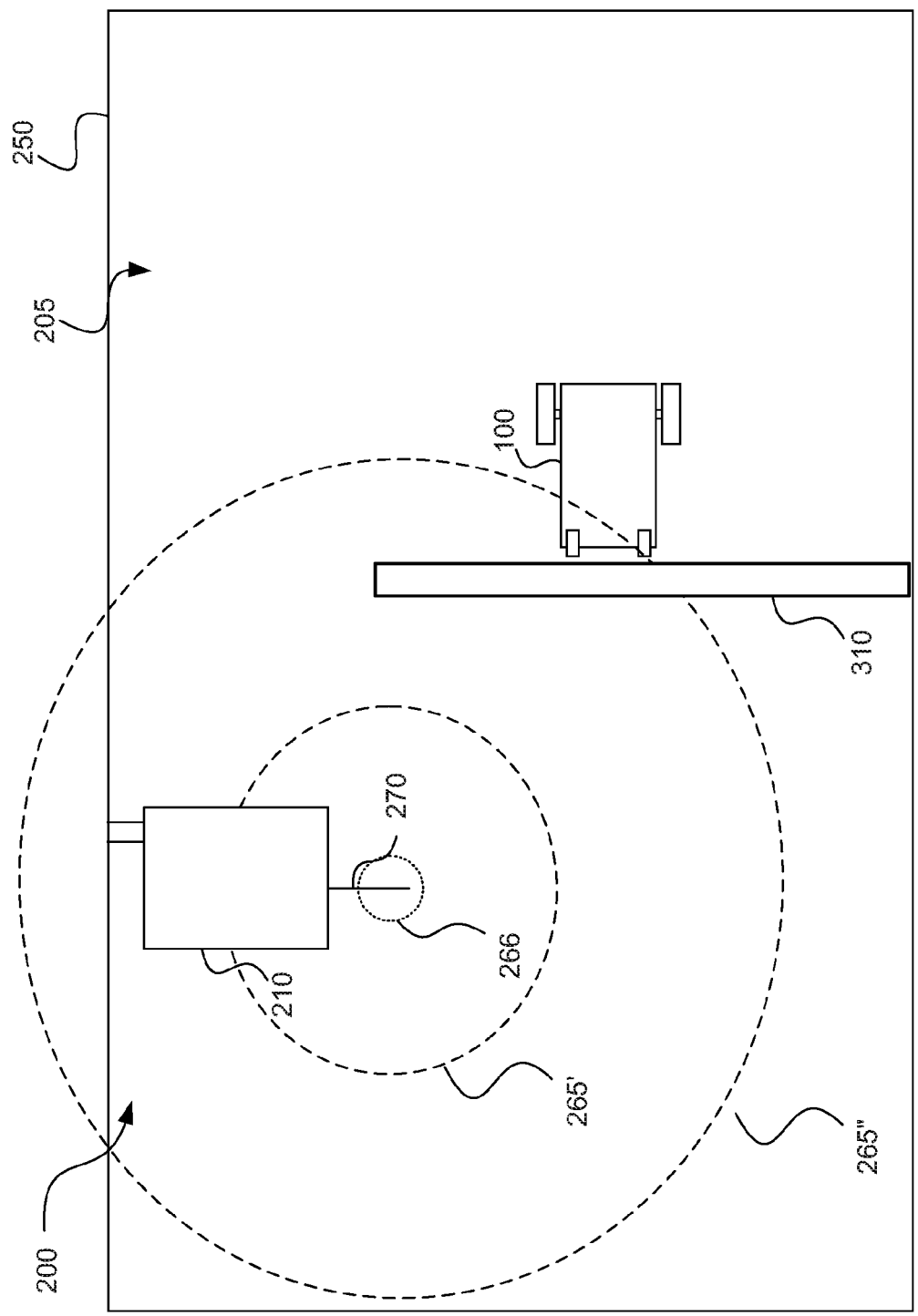
FIG. 3 shows a schematic view of a robotic work tool and a work area according to one embodiment of the teachings of this application.

FIG. 3 shows a schematic view of a robotic work tool 100, such as the robotic work tool of FIG. 1, and a work area 205, being demarcated with a boundary wire 250, in which work area 205 a charging station 210, such as the charging station 210 of FIG. 2, is placed. It should be noted that the centre of the F-range has been illustrated to emanate from the end of the guide cable 270 in FIG. 3. This is for illustrative purposes only and it should be noted that the F-range need not be restricted to emanate from any one point, but can emanate from an area, such as from a looped cable. The F-range may also emanate from the charging station 210 itself.

The charging station 210 is arranged to emit an F-range 265 as indicated by the dashed lines. In the example of FIG. 3 two different F-ranges are shown. In the example of FIG. 3 a first F-range 265' having a short range or a lower magnetic field strength and a second F-range 265" having a long range or a stronger magnetic field strength are shown. It should be noted that the first and the second F-ranges 265', 265" are not active at the same time even though they are shown as being simultaneous in FIG. 3.

At the centre of the F-ranges 265', 265" there is indicated an area 266 with a maximum magnetic field strength. As has been disclosed above, the robotic work tool 100 is configured to drive through the F-range in a direction of increasing magnetic field strength. The robotic work tool 100 will thus eventually reach the area with the maximum magnetic field strength 266. In the example embodiment of FIG. 3, there is a guide cable 270 arranged to lead from (or through) the area with the maximum magnetic field strength 266 to the charging station 210. This allows the robotic work tool 100 to easily find the guide cable 270 which will guide the robotic work tool 100 in to the charging station 210.

In an embodiment where the robotic work tool 100 is configured to follow the F-range when running low on battery the robotic work tool 100 will either roam the work area 205 or follow the boundary wire 250 until it can sense the F-range (properly) and then start traversing the F-range in the direction of increasing magnetic field strength.

However, if the robotic work tool 100 should for example be blocked by an obstacle 310 as in the situation of FIG. 3 the robotic work tool 100 may be unable to traverse the second F-range 265" in according to increasing magnetic field strength and get stuck behind the obstacle 310.

One solution would be to enable the robotic work tool 100 to recognise that it is stuck behind one and the same obstacle 310 and thereby perform evasive manoeuvres. However, such a solution would be costly in that the robotic work tool 100 would have to be able to identify that it is the same obstacle(s) 310 that it is repeatedly encountering and such identification requires advanced sensors and a complicated identification routine which all adds to the price of the robotic work tool 100.

The inventors of the present invention have realized, after insightful and inventive reasoning and experimentation, that by adapting, such as by decreasing the F-range 265 or adjusting the threshold level for detecting the F-range, the risk of the robotic work tool 100 getting stuck behind an object is reduced. Also, the risk of the robotic work tool 100 accidentally escaping the boundary wire 250 is also reduced as there is smaller risk of a smaller F-range extending beyond the boundary wire 250.

The detection of the F-range 265 may be enabled by either adapting the F-range 265 by adjusting the current level for the current generating the F-range or by adjusting a threshold level at which the robotic work tool 100 is configured to detect the F-range 265. The two manners may also be implemented in combination.

In the example of FIG. 3 the robotic work tool 100 would not get stuck behind the obstacle 310 as it can not yet sense or detect the first (smaller) F-range 365' and would simply continue traversing the work area 205 until it finds either a boundary wire 250 or the F-range 265' to guide it to the guide cable 270 for reaching the charging station 210.

The robotic work tool system 200 according to the teachings herein is thus configured to adapt the F-range to reduce the risk of the robotic work tool 100 getting stuck behind an obstacle 310 or accidentally escaping the work area 205.

In one embodiment the robotic work tool system 200 is configured for manual adaptation of the F-range 265 by enabling a user to set (or increase/decrease) the current level for the current generating the magnetic field that constitutes the F-range 265 and/or enabling a user to adjust (or increase/decrease) the threshold level for detecting the F-range. The user would then be able to adapt the robotic work tool system 200 according to his (specific) work area 205, such as a garden. If the user knows that he has many obstacles 310 he may adapt the robotic work tool system 200 to use a shorter F-range 265 or higher threshold to reduce the risk of the robotic work tool 100 getting stuck.

In one embodiment the robotic work tool system 200 is configured for automatic adaptation of the F-range 265. In one such embodiment the robotic work tool 100 is configured to determine that it is being prevented from reaching or unable to reach the charging station 210, and also possibly how frequently this occurs. The determination can be based on counting the number of times that the robotic work tool 100 runs out of power while trying to find its way to the charging station 210. The determination may also be based on the robotic work tool 100 monitoring how often it collides with obstacles 310 while following the F-range 265. The determination may also be based on the robotic work tool 100 spending an un-proportionately long time following the F-range. Possibly the robotic work tool 100 is configured to base the determination on the robotic work tool 100 spending an un-proportionately long time in an magnetic field strength range without reaching an area of increased magnetic field strength.

The length of time spent in a magnetic field strength range or traversing the F-range 265 is, of course, dependent on the size of the work area 205 and may thus depend on the model of the robotic work tool 100 and the work area size that the robotic work tool 100 is designed for. For example, for a robotic work tool 100, such as a lawnmower robot, designed for maintaining a small-sized garden, an un-proportionately long time may be any time above 5 minutes, or above a time in the range 5 to 10 minutes. For a robotic work tool 100 designed for maintaining a large field, an un-proportionately long time may be any time above 15 minutes, or in the range of 10 to 20 minutes. Similar times are applicable to the length of time allowed to be spent in a magnetic field strength range.

The robotic work tool 100 is configured to determine that it has been blocked by an obstacle and in response thereto inform the rest of robotic work tool system 200, for example the charging station 210, which adapts the F-range 265"

accordingly to a decreased range 265' or the robotic work tool 100 adapts the threshold level by increasing the threshold level.

Similarly, the robotic work tool 100 may be configured to determine that it never (or rarely) gets stuck or follows the F-range for a short time and in response thereto inform the robotic work tool system 200, for example the charging station 210, to adapt the F-range 265' to an increased range 265" or the robotic work tool 100 adapts the threshold level by decreasing the threshold level.

In one embodiment, where the robotic work tool 100 is configured to communicate with the rest of the robotic work tool system 200, for example the charging station 210, during operation or a working session, the robotic work tool 100 is configured to determine that it is most likely stuck and in response thereto instruct the charging station 210 (or other component of the robotic work tool system 200) to adapt the (detection of the) F-range to a decreased size (by decreasing the current or increasing the threshold level), thereby allowing the robotic work tool 100 to roam more freely. The determination that the robotic work tool 100 is stuck or unable to reach the charging station 210 may be based on the same premises as discussed in the above with relation to spending an un-proportionately long time or colliding repeatedly. This allows for an automatic and dynamic adaptation of the F-range (detection) which reduces the risk of the robotic work tool 100 not being able to reach the charging station 210 during an on-going work session and thereby does not require user interaction.

The communication between the robotic work tool 100 and the charging station 210 (or other component of the robotic work tool system 200) may be achieved through a radio frequency communication interface, such as for example an LTE interface (Long Term Evolution). Such radio frequency interfaces are well-known in the technical field of telecommunications and will not be discussed in further detail herein.

Figure 4:
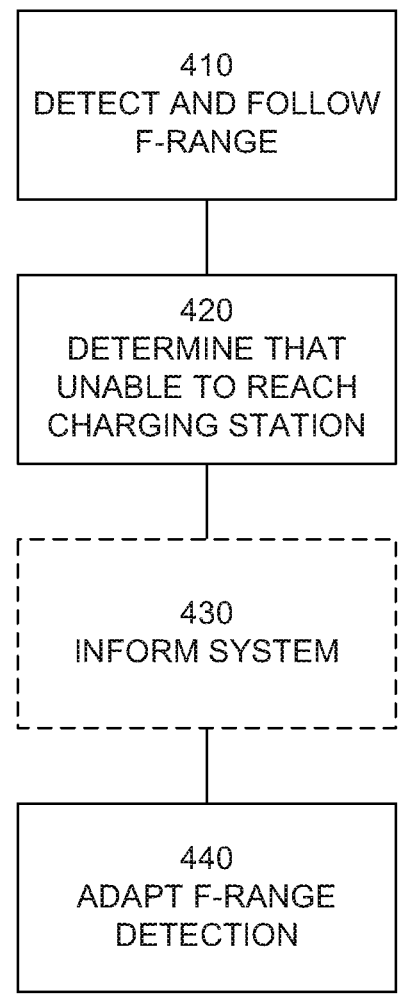
FIG. 4 shows a flowchart for a method according to one embodiment of the teachings of this application.

FIG. 4 shows a flow chart for a general method of the teachings herein. The method will be described with simultaneous reference to FIGS. 1, 2 and 3.

The method is implemented by a robotic work tool 100, such as the robotic work tool 100 of FIG. 1 being part of a robotic work tool system, such as the robotic work tool system 200 of FIG. 2.

The robotic work tool 100 determines that it is low on battery and needs to return to the charging station 210. The robotic work tool 100 detects and starts to follow 410 an F-range 265. The robotic work tool 100 determines 420 that it is (or has been) unable to reach the charging station 210, possibly by running out of battery power. The robotic work tool 100 informs 430 the charging station 210 (or other component of the robotic work tool system 200) that it is or has been unable to reach the charging station 210 and the robotic work tool system 200 adapts 440 the F-range 265 accordingly by adjusting the current level of the signal that generates the F-range 265. Alternatively or additionally the robotic work tool 100 adjusts the threshold for detecting the magnetic field 265.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

One benefit of the teachings herein is that the robotic work tool system is enabled to adapt to differing work areas so that the risk that the robotic work tool is unable to reach the charging station is greatly reduced.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool system, comprising:
a robotic work tool,
a charging station,
a boundary wire, and
a signal generator configured to generate and transmit a signal through the boundary wire for demarcating a work area, and configured to generate a magnetic field for guiding the robotic work tool to the charging station, the magnetic field for guiding the robotic work tool to the charging station being generated by either a conductive loop other than the boundary wire and associated with the charging station or a cable other than the boundary wire and associated with the charging station, the robotic work tool being configured to:
detect a magnetic field strength of the magnetic field for guiding the robotic work tool to the charging station in the work area;
direct the robotic work tool towards an increasing magnetic field strength of the magnetic field for guiding the robotic work tool to the charging station;
determine that the robotic work tool is unable to reach the charging station; and
in response to determining that the robotic work tool is unable to reach the charging station, decrease a range from the charging station within which the robotic work tool operates to move towards the increasing magnetic field strength of the of the magnetic field for guiding the robotic work tool to the charging station.

2. The robotic work tool system according to claim 1, wherein the robotic work tool is further configured to decrease the range by causing the signal generator to adapt a current level to the conductive loop other than the boundary wire or the cable other than the boundary wire that generates the magnetic field for guiding the robotic work tool to the charging station.

3. The robotic work tool of claim 2, wherein the robotic work tool configured to cause the signal generator to adapt the current level includes being configured to cause the signal generator to decrease the current level to the conductive loop other than the boundary wire or the cable other than the boundary wire.

4. The robotic work tool system according to claim 1, wherein the robotic work tool is configured to decrease the range by adjusting a threshold magnetic field strength level for detecting the magnetic field generated by the conductive loop other than the boundary wire or the cable other than the boundary wire.

5. The robotic work tool of claim 4, wherein the robotic work tool configured to adjust the threshold magnetic field strength level includes being configured to increase the threshold magnetic field strength level at which the robotic work tool transitions to moving towards the increasing magnetic field strength of the magnetic field for guiding the robotic work tool to the charging station.

6. The robotic work tool system according to claim 1, wherein the the magnetic field generated by the conductive loop other than the boundary wire or the cable other than the boundary wire is manually adaptable by a user.

7. The robotic work tool system according to claim 1, wherein the magnetic field generated by the conductive loop other than the boundary wire or the cable other than the boundary wire is automatically adaptable by the robotic work tool.

8. The robotic work tool system according to claim 1, wherein the robotic work tool is configured to determine that the robotic work tool is unable to reach the charging station based on a number of times the robotic work tool collides with an object while moving towards the increasing magnetic field strength of the of the magnetic field for guiding the robotic work tool to the charging station.

9. The robotic work tool system according to claim 1, wherein the robotic work tool is configured to determine that the robotic work tool is unable to reach the charging station based on a duration of time spent to find the charging station while moving towards the increasing magnetic field strength of the of the magnetic field for guiding the robotic work tool to the charging station.

10. The robotic work tool system according to claim 1, wherein the robotic work tool configured to decrease the range includes being configured to cause the signal generator to decrease the magnetic field strength of the magnetic field generated by the conductive loop other than the boundary wire or the cable other than the boundary wire.

11. The robotic work tool system according to claim 1, wherein the robotic work tool is further configured to:
determine the robotic work tool a frequency that the robotic work tool is able to reach the charging station, and
based on the frequency, cause the signal generator to increase a magnetic field strength of the magnetic field generated by the conductive loop other than the boundary wire or the cable other than the boundary wire.

12. The robotic work tool system according to claim 1, wherein the robotic work tool is further configured to communicate during a working session and instruct the signal generator, during the working session, to dynamically adapt the magnetic field generated by the conductive loop other than the boundary wire or the cable other than the boundary wire.

13. The robotic work tool system according to claim 1, wherein robotic work tool is a robotic lawn mower.

14. A method for use in a robotic work tool system, the robotic work tool system comprising:
a robotic work tool,
a charging station,
a boundary wire, and
a signal generator configured to generate and transmit a signal through the boundary wire to demarcate a work area, and configured to generate a magnetic field for guiding the robotic work tool to the charging station, the magnetic field for guiding the robotic work tool to the charging station being generated by either a conductive loop other than the boundary wire and associated with the charging station or a cable other than the boundary wire and associated with the charging station,
the method comprising:
detecting a magnetic field strength of the magnetic field for guiding the robotic work tool to the charging station in the work area;
directing the robotic work tool towards an increasing magnetic field strength of the magnetic field for guiding the robotic work tool to the charging station;
determining that the robotic work tool is unable to reach the charging station; and
in response to determining that the robotic work tool is unable to reach the charging station, decreasing a range from the charging station within which the robotic work tool operates to move towards the increasing magnetic field strength of the of the magnetic field for guiding the robotic work tool to the charging station.

15. The method according to claim 14, wherein decreasing the range further comprises decreasing the range by causing the signal generator to adapt a current level to the conductive loop other than the boundary wire or the cable other than the boundary wire that generates the magnetic field for guiding the robotic work tool to the charging station.

16. The method of claim 15, wherein causing the signal generator to adapt the current level comprises causing the signal generator to decrease the current level to the conductive loop other than the boundary wire or the cable other than the boundary wire.

17. The method according to claim 14, wherein decreasing the range further comprises decreasing the range by adjusting a threshold magnetic field strength level for detecting the magnetic field generated by the conductive loop other than the boundary wire or the cable other than the boundary wire.

18. The method of claim 17, wherein adjusting the threshold magnetic field strength level comprises increasing the threshold magnetic field strength level at which the robotic work tool transitions to moving towards the increasing magnetic field strength of the magnetic field for guiding the robotic work tool to the charging station.

* * * * *